Figure 1:
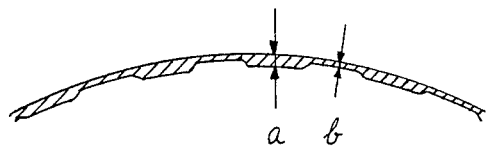

United States Patent [19]

Stein

[11] Patent Number: 4,729,806

[45] Date of Patent: Mar. 8, 1988

[54] METHOD FOR MAKING TUBES HAVING LOW WEIGHT

[75] Inventor: Bengt Stein, Bynasvagen 18F, Sweden

[73] Assignee: Affarsverket FFV, Eskilstuna, Sweden

[21] Appl. No.: 895,887

[22] Filed: Aug. 12, 1986

[30] Foreign Application Priority Data

Aug. 13, 1985 [SE] Sweden ................................ 8503790

[51] Int. Cl.⁴ .......................................... B32B 31/20
[52] U.S. Cl. ..................................... 156/172; 156/245; 156/293; 156/294; 42/76.01; 42/76.02; 72/56; 72/57; 72/58; 72/59; 72/60; 72/63; 72/367; 72/370
[58] Field of Search ............... 156/172, 242, 245, 253, 156/254; 72/56, 57, 58, 59, 60, 63, 367, 370; 42/76.01, 76.02; 29/1.21, 1.23, 1.3; 428/457, 458

[56] References Cited

U.S. PATENT DOCUMENTS

| | | | |
|---|---|---|---|
| 2,935,913 | 5/1960 | Wilson | 42/76.02 |
| 3,571,962 | 3/1971 | Eig | 42/76.02 |
| 4,024,008 | 5/1977 | Gregornik et al. | 156/294 |
| 4,238,540 | 12/1980 | Yates et al. | 156/172 |
| 4,265,951 | 5/1981 | Yates et al. | 156/172 |
| 4,294,100 | 10/1981 | Olschewski et al. | 72/367 |
| 4,519,230 | 5/1985 | Chachin et al. | 72/56 |
| 4,566,300 | 1/1986 | Gebelius | 72/63 |

*Primary Examiner*—Caleb Weston

[57] ABSTRACT

A method for the manufacture for the tubes or shafts of a composite material and having a low weight, whereby a blank of a material that can be pressformed and which has a substantially even thickness of material is subjected to isostatic pressing on or in a formation tool thereby providing a shell or a liner (15) of an intended shape and profile and having a mainly by substantially thickness of material, and on or in said shell or liner (15) another material is applied and is bound, for instance a highstrength material like glassfiber, carbon fiber or aramide fiber, so that the liner (15) and said other material (17) provide a solid integral composite tube or composite shaft. A tube made according to the method can be a barrel, whereby the liner (15) preferably has a conically shaped charged space and is formed with riffels in the race, which rifels have a progressively increased pitch in the direction towards the outer end of the barrel, and whereby the lower rifel portions on the outside of the liner (15) portions are filled with another material, and the liner is completely covered with preferably highstrength material having a low density, whereby the liner (15) and the other material or materials provide solid integral unit. Correspondingly a shaft can be formed with outer shaft shell of a material that can be pressformed and an inner filler material of a preferably highstrength material having a low density.

8 Claims, 6 Drawing Figures

METHOD FOR MAKING TUBES HAVING LOW WEIGHT

The present invention generally relates to a method for making tubes or shafts having a low weight, and low weight tubes or shafts made according to the method.

The invention has been developed in connection to manufacture both of shafts and tubes for which there is a need of a low weight and a good strength combined with a more or less complicated outer or inner shape. One such application is the manufacture of barrels for weapons, and in the following the invention will mainly be described in connection thereto as a non-limiting application of the invention. It is, however, obvious to the expert that the method can also be used in the manufacture of any type of other tubes or shafts where there is a wish to make a both strong and light weight construction element at a low cost by utilizing modern manufacturing methods and modern materials.

In order to give the projectile both a high rotation speed and a high firing speed barrels for weapons, for instance barrels for shell guns, must be formed with inner rifles which force the projectile to rotate around its own axis while passing the barrel. For projectiles adapted to have very high rotation speeds the inner rifles generally are formed with a progressively increasing pitch so that the accleration of rotation is adequately distributed along the length of the barrel.

The projectile subjects the barrel to great stresses when passing through the barrel, both depending on the pressure and the heat from the hot gases and also depending on the mechanical forces acting both axially and radially and tangentially by which forces the gas pressure and the projectile acts on the barrels.

It has previous been considered that only barrels of metal, especially barrels of steel have had a sufficient strength for standing such forces.

Barrels made of steel, however, are very heavy and they are complicated and expensive to manufacture, especially since the inner of the barrel must be slightly conical and partly must have the above mentioned rifles, and since the said rifles generally must be made by chip removing working of a barrel blank.

Therefore attempts have been made to manufacture barrels in the form of a two or more layer laminated material comprising an inner relatively thin tube shell, a so called liner, and outside said liner a winding of a material having a high strength and a low density, for instance a plastic bound carbon fiber or a similar material. Also in this case it has been considered necessary to form the inner rifles by chip removing working and this is a complicated, time consuming and expensive operation. In the last mentioned case the method started with a tube having an even thickness and on the inner side of which rifle recesses have been cut out which provide rifle notches therebetween. By the cutting operation there is a strong reduction of the thickness of material at the areas of the recesses, and said relatively thin material portions can be subjected to such tangential elongations combined with such pressure and heat stresses that the material is subjected to fatigue tendencies and even crackings. As a consequence such barrels get a relatively restricted shot capacity unless the tube shell is wound with a large amount of material considering the said elongations, whereby, however, disadvantages and problems may appear depending on the large amount of wound material.

There may be equivalent problems for many other types of tubes and many other applications, for instance when forming lightweight and strong shafts from hollow tubes and having an inner filler material, and therefore the invention is not solely directed to barrels for weapons, but also relates manufacture of tubes and shafts of many different types and intended for all kinds of purposes.

Therefore there has been a need for a method for a manufacture of tubes or shafts of different types which have a low weight and which are strong, and in which a tube of said type is composed by an inner shell or a "liner" of metal and an outer covering of a high strength material, or in which a shaft of said type correspondingly is composed of an outer shell of metal and an inner high strength filler material, whereby the tube or shaft can be made easily and to a relatively low cost, in which the shell or liner can be given any wanted inner/or outer profile, in which the shell or liner has an even thickness of material without any strength reduced portions which otherwise could form basis for rupture, and in which the tube or shaft is formed to allow a certain elastic elongation both axially and radially.

In a preferred embodiment of the invention the inner or outer metal shell is a metal tube, which by so called isostatic pressing is given the intended profile on the outer side or inner side or on both sides, for instance a conical form, rifles or any other profile, and in which the metal shell is wound with a stabilizing material like a plastic bound glass fibre, carbon fibre, aramide fibre or any other high strength fibre material, or at the interior is filled with a corresponding material so that the ready tube or the ready shaft provides a composite product of metal-fibre material.

The isostatic pressing method is known perse for quickly and easily forming materials, espcially objects of metal having such complicated cross section shape which only with difficulties can be provided by means of chip removing working. The isostatic pressing also involves the advantage that the press formed pieces of material gets a substantially even thickness of material at all parts thereof.

The manufacture of for instance rifle tubes like barrels for weapons also is advantageous that the liner, which is zig zag formed in cross section and which in all parts have an even thickness of material by a type of "harmonica effect" has a possibility of becoming widened and compressed elastically, and still no parts of the liner is subjected to elongation of materials which may damage the material and provide fatigue tendencies or tendencies of ruptures or fisures. The liner may accordingly very well cooperate with an outer relatively high elastical material. There is a corresponding situation for shafts having an outer specific formation.

When making tubes having a profile shape shell the recesses on the outside of the tube or the cavities are filled with a suitable material, for intance a plastic material, and the liner is wound with the high strength fibre material and is given its final outer shape.

Figure 2:
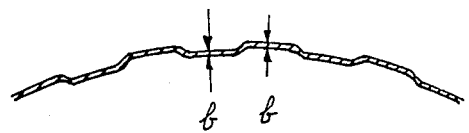
Figure 5:
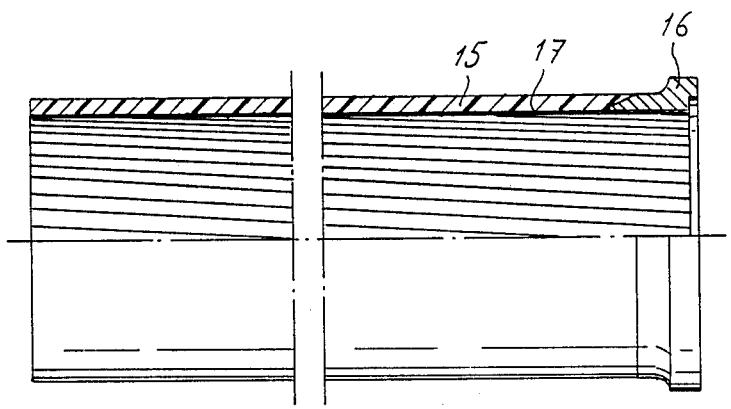
Figure 6:
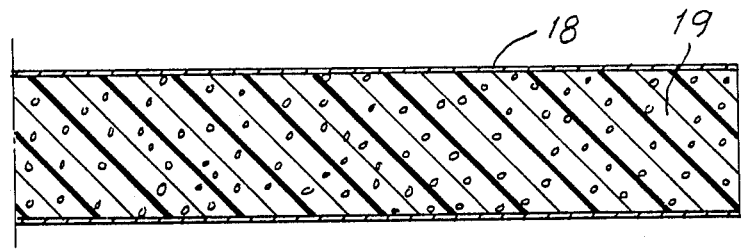
Figure 3:
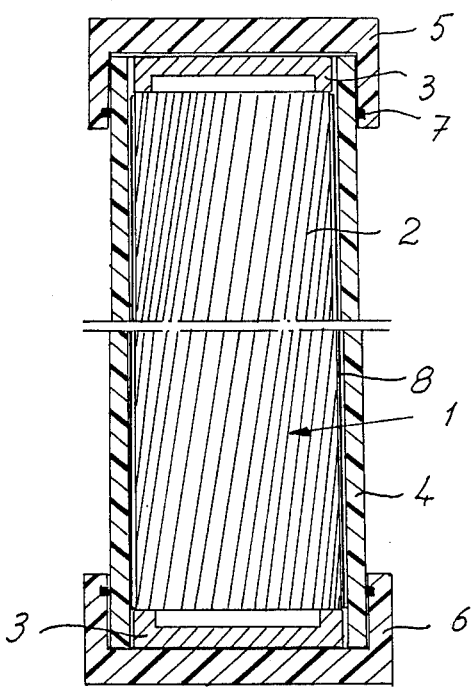

Further characteristics of the invention will be evident from the following detailed description in which reference will be made to the accompanying drawings. In the drawings FIG. 1 shows a little portion of a liner for a barrel of a composite material type which was manufactured before the invention, and FIG. 2 shows a liner for a corresponding barrel made by isostatic pressing according to the invention. FIG. 3 shows a cross section of a tool for isostatic pressing of a shell or a liner for a tube according to a first embodiment of the invention, and FIG. 4 correspondingly shows a second embodiment of a tool for isostatic pressing of a shell or a liner for a tube according to the invention. FIG. 5 shows an axial cross section through a ready made tube according to the invention. FIG. 6 correspondingly shows an axial cross section through a shaft made according to the invention.

The basis of the invention is to make a shell or a liner of metal by isostatic pressing and on or in which shell or liner a high strength fiber material is wound or otherwise applied and is bound as conventional by means of a suitable resin. Isostatic pressing is known per se of means, in this case, that a tube having a substantially even thickness of material is applied in or on a preferably profiled mandrel of the same shape as the intended final shell or liner, whereupon the tool mandrel together with the shell blank is introduced or decended in a pressure chamber and is subjected to a liquid pressure by means of which the shell blank with a high pressure is pressed to the mandrel profilings thereby giving the shell the intended shape, eventually with a slight elastic re-deflexion of the blank material. Isostatic pressing can be made hot or cold, but cold pressing is to be preferred.

FIG. 1 shows a little portion of a liner for a barrel having inner rifles and made by chip cutting of a tube blank. It is obvious that the thickness of material at the notches is the same as the thickness of the original tube blank, whereas the cut recesses get a substantially reduced thickness of material. When making barrels for shell guns according to a specific method the barrel was made from a tube blank having a wall thickness of 1.5 mm and the recesses were cut down about 1 mm, that is so that the thickness of the material at the recesses is only about 0.5 mm. The said thickness of material is quite sufficient since the liner was wound with a high strength fiber material, but a weapon having such barrel has a limited shot capacity since the material at the recesses are subjected to strong stresses when shooting with a gun, especially elongation in the tangential direction and subsequent fatigue tendencies and fissure formations, whereas the material at the notches is substantially intact. In order to avoid that the weapon becomes too heavy it is wanted to keep the thickness of material as low as possible, and therefore it is considered disadvantageous to increase the thickness of material of the blank tube.

By forming the blank tube or "the liner" by isostatic pressing as shown in FIG. 2 according to the invention several advantages are obtained. Isostatic pressing is made quicker, more simpler and to a lower cost than the previously known chip cutting of the tube; there is a possibility of shaping the tube to very complicated shapes, for instance conical forms having rifles with a progressively increasing pitch; the starting object is a tube having a substantially even thickness of material, and also after the pressing the tube has still an even thickness of material; by the zig-zag shape of the formed liner the liner and thereby the entire barrel can become widened in the peripheral direction (radial direction) and it can contract elastically by a type of "harmonica effect" and still no parts of the liner is subjected to such stretching or elongations that the material becomes fatigued or get fissures, and therefore a barrel made according to the invention has a higher shot capacity and a longer life than barrels made according to previous methods.

Figure 4:
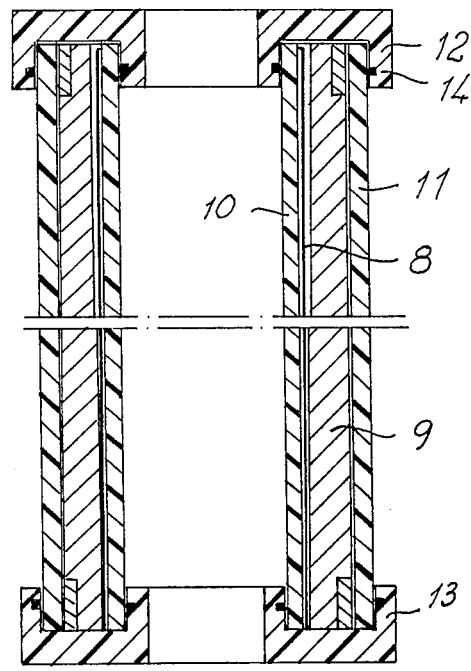

A tool is used for formning the liner, which tool may be of the inner pressed type as shown in FIG. 3 or the outer pressed type as shown in FIG. 4.

The tool FIG. 3 comprises a mandrel 1 formed with rifles 2 or other profile formations. At each end there is a guide 3, and round the mandrel 1 and the guides 3 there is a tool of rubber type, for instance polyuretane and consisting of a cylindric sleeve 4, a top 5 and a bottom 6 which enclose the rubber sleeve 4 and seals thereto by means of sealing rings 7. A liner blank 8 is placed on the mandrel and is enclosed in the rubber mould 4–6, and the liner under the tool is decended in a pressure chamber (isostatic pressing bath) whereby the rubber sleeve 4 presses the liner blank 8 to the mandrel 1, so that the liner is formed like the mandrel, or instance with the form as indicated in FIG. 2.

When making barrels the charge chamber of which are conical the mandrel must have the equivalent conical shape and the tube blank is preformed in a separate formation step (see FIG. 4), since there is otherwise a risk that the liner is crinkled on one or more places depending on the strong compression.

The mandrel is of split type and may comprise for instance 4 or 6 actual mandrels parts which are kept in correct position during the pressing by a support rod or by endguides. When relieving the formed liner the inner support rod is removed, whereby the mandrel parts can be released and removed from the liner. FIG. 4 shows a tool for forming a liner inside a split or inner profiled formation tool which is supported between an inner rubber sleeve 10 and an outer sleeve 11, a rubber lid 12 and rubber bottom 4 which are sealed to the sleeves 10 and 11 by means of sealing rings 14. In this case the pressing is made radially outwards to the inner profiled formation tool 9, and after the formpressing the liner 8 is released by separating the split parts of the formation tool 9.

According to a preferred embodiment of the invention the inner rubber sleeve 10 is of slightly harder material than the outer sleeve 11, and the space between the inner sleeve 10 and the formation tool 9 is slightly greater than the space between the outer sleeve and the formation tool 9. When the entire tool together with the liner is dropped down in the press bath the outer rubber sleeve 11 thereby compresses the actually split parts of the formation tool 9 so that the tool is tightly compressed and kept steadily before the inner sleeve 10 presses the liner 8 to the inner profiled pressing tool 9.

In case the liner or the shell tube for the shaft of FIG. 3 is completely tight the rubber sleeve in FIG. 3 can be excluded and the top 5 and the bottom 6 thereby seal directly to the liner. Also in FIG. 4 at least sleeve 10 can be excluded if a completely tight liner is used which can seal to the lid 12 and the bottom 13. It may in some cases be advantageous to exclude the rubber sleeve, for instance sharper edges are obtained in the pressed liner or shaft shell.

When form pressing radially outwards like in FIG. 4 it is also possible to concurrently therewith give the tube a slightly conical and profiled shape, and the relatively slight cone formation of the tube has a neglectible influence on the final thickness of material of the liner.

For making the tube ready it is wound with a high strength fiber material like glassfiber, carbonfiber or any other highstrength fibers material which as conventionally is bound with a suitable plastic material, for instance a polyester resin and epoxy resin or a similar resin. The fiber material is wound in spiral formation round the liner and in several layers and is bound with the plastic binder. The fiber material gives a good strength in the tangential direction in which a profiled or rifled liner has a relatively weak strength. The fiber material, on the contrary, gives a weak strength in the actual direction of the tube, but in this direction the tube or liner oppositely has a high strength.

In the case that the tube or liner is profiled as shown in FIG. 2 the low parts at the outer side of the tube or liner are filled with a suitable material, for instance a suitable resin before the fibre material is wound and bound on the liner. FIG. 5 shows a partial actual cross section through a ready liner according to the invention and as seen from the figure a fitting 16 is welded to the end of a liner 15, and the exterior of the liner is covered with a plastic bound fiber material 17.

FIG. 6 shows an actual cross section through a shaft made according to the invention and comprising an outer shaft shell 18 of an isostatic pressed blank which may have the intended profilings at the exterior thereof, and an inner filler material 19 of a suitable material, for instance a suitable plastic material. The shaft can be made so that the shaft blank is isostatic pressed as previously described and as shown in FIGS. 3 or 4, whereupon the cavities at the inner side of the shaft blank are filled with a mouldable material, for instance a plastic material, and in the inner actual cavity a filler material is introduced, which filler material can be mould in the cavity or can be formed to a rod which is pressed into this edge shaft cavity.

It is to be understood that the above description and the embodiments illustrated in the drawings are only of examplifying character and that many modifications may be presented within the scoope of the appended claims.

I claim:

1. A method for manufacturing a tubular device and the like of a composed material, said method comprising the steps of:
    forming a tube blank having a substantially even wall thickness and made of a first material, said wall having a predetermined cross sectional shape;
    mounting said tube blank in cooperating position with a press tool and a mandrel having the desired shape and profilings of the tubular device to be formed;
    descending said press tool and said tube blank in an isostatic pressing bath;
    isostatically pressing said tube blank against said mandrel to produce a liner, and
    covering said liner with a second material to form a solid, integral composite tubular device, said second material being a high strength fiber material and being bound to said liner by a binder.

2. A method for manufacturing a tubular device in accordance with claim 1 wherein the step of covering said liner includes spirally winding said liner with said high strength fiber material, said wound fiber material providing tangential strength for said integral composite tubular device and said liner providing strength in a direction of its elongation.

3. A method for manufacturing a tubular device in accordance with claim 1 wherein said step of forming a liner includes forming a liner with rifles, said liner having an outer portion and first and second ends and recesses along said outer portion;
    filling the recesses along the outer portion at one of said first and second ends with a filler material, and covering said outer portion and said filled portion with said high strength fiber material.

4. A method for manufacturing a tubular device in accordance with claim 3 wherein said step of forming a tube blank includes forming a tube blank having a conical shape.

5. A method for manufacturing a tubular device in accordance with claim 1 wherein said step of forming a liner includes isostatically pressing said tube blank against a mandrel having a conical shape and desired profilings.

6. a method for manufacturing a tubular device in accordance with claim 5 wherein the step of isostatically pressing said tube blank includes forming a barrel for a weapon by isostatically pressing said tube blank between the inner facing and outer facing walls of a formation tube, said formation tube having profilings to produce a rifled bore and a conical charge space.

7. A method for manufacturing a tubular device in accordance with claim 1 wherein the step of isostatically pressing said tube blank includes:
    pressing said tube blank against an inner mandrel to form a cyclindrical shell liner;
    filling the recesses in the inner wall of said cyclindrical shell liner with a moldable material to provide an inner cavity having a substantially smooth surface, and
    filling said inner cavity with a filler material to produce a shaft.

8. A method for manufacturing a tubular device in accordance with claim 7 wherein said step of filling said inner cavity includes filling said cavity with a rod having a high strength material and low density, said rod having a diameter slightly larger than the diameter of said cavity and being pressed into said cavity.

* * * * *